(12) United States Patent
Kudo

(10) Patent No.: US 8,713,313 B2
(45) Date of Patent: Apr. 29, 2014

(54) TERMINAL DEVICE, SYSTEM AND COMPUTER READABLE MEDIUM

(75) Inventor: Yasuhiro Kudo, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 216 days.

(21) Appl. No.: 12/715,505

(22) Filed: Mar. 2, 2010

(65) Prior Publication Data

US 2010/0228979 A1    Sep. 9, 2010

(30) Foreign Application Priority Data

Mar. 6, 2009   (JP) ................................ 2009-054011

(51) Int. Cl.
*H04L 9/32* (2006.01)
*G06F 15/16* (2006.01)

(52) U.S. Cl.
USPC .......................................... 713/168; 709/227

(58) Field of Classification Search
None
See application file for complete search history.

(56) References Cited

U.S. PATENT DOCUMENTS

| | | | |
|---|---|---|---|
| 5,721,780 A * | 2/1998 | Ensor et al. ................. | 713/155 |
| 7,907,599 B2 * | 3/2011 | Hardie et al. ................ | 370/352 |
| 7,954,141 B2 * | 5/2011 | De Lutiis et al. ............ | 726/9 |
| 7,974,206 B2 * | 7/2011 | Fodil et al. .................. | 370/235 |
| 2004/0196506 A1 | 10/2004 | Izumi et al. | |
| 2007/0078986 A1 * | 4/2007 | Ethier et al. ................. | 709/227 |
| 2010/0228978 A1 * | 9/2010 | Kudo .......................... | 713/168 |
| 2010/0268937 A1 * | 10/2010 | Blom et al. .................. | 713/153 |

FOREIGN PATENT DOCUMENTS

| | | |
|---|---|---|
| JP | 2004-304711 | 10/2004 |
| JP | 2006-140903 | 6/2006 |
| JP | 2008-016932 | 1/2008 |

OTHER PUBLICATIONS

"A new authentication mechanism and key agreement protocol for SIP using identity-based cryptography", by Ring et al. 2006.*

* cited by examiner

*Primary Examiner* — Saleh Najjar
*Assistant Examiner* — Oleg Korsak
(74) *Attorney, Agent, or Firm* — Banner & Witcoff, Ltd.

(57) ABSTRACT

A second terminal device is used in a system including a server, a first terminal device, and the second terminal device. The second terminal device includes: a first command transmission unit configured to transmit a first command to the first terminal device via the server; a storage control unit configured to hold a first address and first authentication information of the first terminal device; a second command transmission unit configured to transmit a second command to the first address; a determination unit configured to determine whether a terminal device as a destination of the second command is the first terminal device, by using first response data from the terminal device and the first authentication information; and a third command transmission unit configured to transmit a third command to the first address if the terminal device is determined to be the first terminal device.

8 Claims, 10 Drawing Sheets

TERMINAL DEVICE, SYSTEM AND COMPUTER READABLE MEDIUM

CROSS-REFERENCE TO RELATED APPLICATIONS

This application claims priority from Japanese Patent Application No. 2009-054011 filed on Mar. 6, 2009, the entire contents of which are incorporated herein by reference.

TECHNICAL FIELD

The present invention relates to a terminal device configured to communicate with another terminal device.

BACKGROUND

In order to perform a target data communication between a pair of terminal devices, a connection management server may be used. For example, there is a data communication system using an SIP (Session Initiation Protocol). The system using the SIP uses a connection management server called an SIP server. Each of the terminal devices registers an ID (e.g., SIPURI) and an own IP address in the connection management server. For example, a second terminal device that is to communicate target data with a first terminal device usually does not have an IP address of the first terminal device. Accordingly, the second terminal device communicates an INVITE command, a 200 OK command, an ACK command, etc., with the first terminal device by way of the connection management server. In the middle of this communication operation, the second terminal device obtains an IP address of the first terminal device. As a consequence, the second terminal device can communicate target data (e.g., audio data) with the first terminal device by use of the IP address of the first terminal device. In one technique, the second terminal device obtains an IP address of the first terminal device when performing a data communication with the first terminal device for a first time, and retains the IP address even after completion of the first data communication. When performing a data communication with the first terminal device after completion of the first data communication, the second terminal device transmits a command to the IP address of the first terminal device without involvement of the connection management server while taking the IP address held therein as a destination. Since the command can be transmitted without involvement of the connection management server, processing load on the connection management server can be lessened.

SUMMARY

The IP address of the first terminal device obtained at the first data communication may be changed to another IP address when the second terminal device performs a second data communication. In this case, even when a command is transmitted as a destination to the IP address of the first terminal device obtained at the first data communication, the second terminal device cannot perform the data communication with the target first terminal device. Specifically, in the above-described technique, in case of transmitting a command without involvement of the connection management server, it may be impossible to communicate target data with a target terminal device. According to the present patent specification, there is provided a technique enabling reliable communication of target data communication with a target terminal device even when a command is transmitted without involvement of a connection management server.

According to a first aspect of the invention, there is provided a second terminal device used in a system that comprises a connection management server, a first terminal device, and the second terminal device, said second terminal device comprising: a first command transmission unit configured to transmit, to the first terminal device via the connection management server, a first command for communicating first data with the first terminal device by use of a first address of the first terminal device; an authentication information obtaining unit configured to obtain first authentication information of the first terminal device; a storage control unit configured to hold the first address and the first authentication information in a storage unit; a second command transmission unit configured to transmit a second command to the first address held in the storage unit as a destination without involvement of the connection management server when a communication of second data with the first terminal device is to be performed after completion of a communication of the first data; a determination unit configured to determine whether a particular terminal device identified as a destination of the second command is the first terminal device, by using first response data transmitted from the particular terminal device in response to the second command and the first authentication information held in the storage unit; and a third command transmission unit configured to transmit a third command for communicating the second data with the first terminal device to the first address as a destination without involvement of the connection management server if the determination unit determines that the particular terminal device is the first terminal device.

According to a second aspect of the invention, there is provided a system comprising a connection management server, a first terminal device, and the second terminal device in the first aspect.

DESCRIPTION

Figure 1:
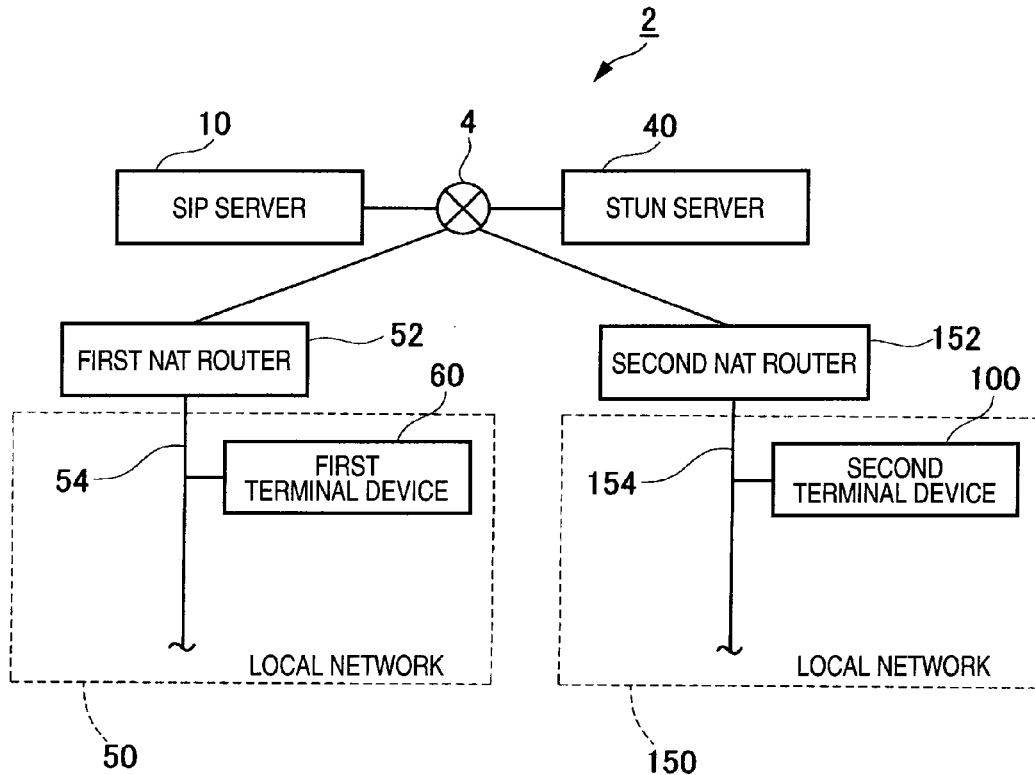
FIG. 1 shows a phone network system according to an embodiment of the invention.

One of techniques described in connection with the embodiments relates to a second terminal device used in a system that includes a connection management server, a first terminal device, and the second terminal device. The second terminal device includes a first command transmission unit, an authentication information obtaining unit, a storage control unit, a second command transmission unit, a determination unit, and a third command transmission unit. The first command transmission unit is configured to transmit, to the first terminal device via the connection management server, a first command for communicating first data with the first terminal device by use of a first address of the first terminal device. As used herein, the term "communicate (communication)" means "transmit (transmission)" and/or "receive (reception)." The term "first address" may include, for example, an IP address (a global IP address or a local IP address) or a combination of an IP address and a port number. The second terminal device may obtain the first address after a transmission of the first command (for example, the first address may be contained in a response received in response to the first command), or may obtain the first address before the transmission of the first command. The phrase "for communicating first data with the first terminal device by use of the first address of the first terminal device" may be translated into a phrase "for transmitting first data to the first address of the first terminal device as a destination." The authentication information obtaining unit is configured to obtain first authentication information of the first terminal device. The authentication information obtaining unit may obtain the first authentication information, for example, from the first terminal device or from the connection management server.

The storage control unit is configured to hold the first address and the first authentication information in a storage unit after completion of a communication of the first data. The phrase "after completion of a communication of the first data" may be translated into another phrase "after disconnection of a communication session for communicating the first data." The phrase "to hold the first address and the first authentication information in a storage unit after completion of a communication of the first data" means that the storage unit is caused to hold the first address and the first authentication information, at least, in a period following the completion of the communication of the first data. Accordingly, the phrase may imply that the storage unit is caused to continually hold the first address and the first authentication information over a period from before the completion of the communication of the first data to the period following the completion thereof. The phrase may be translated into another phrase "to hold the first address and the first authentication information in the storage unit in a case in which the first address and the first authentication information are obtained." The storage control unit may be caused to hold the first address: until a given (or predetermined) period elapses since the communication of the first data is completed; until a user performs predetermined operation (e.g., first address deleting operation); or during a period from the completion of the communication of the first data to a start of a data communication with a terminal device other than the first terminal device.

When a communication of second data with the first terminal device is to be performed after the completion of the communication of the first data, the second command transmission unit transmits a second command to the first address held in the storage unit as a destination without involvement of the connection management server. The determination unit is configured to determine whether a particular terminal device identified as a destination of the second command is the first terminal device, by using first response data transmitted from the particular terminal device in response to the second command and the first authentication information held in the storage unit. If the determination unit determines that the particular terminal device is the first terminal device, the third command transmission unit transmits a third command for communicating the second data with the first terminal device to the first address as a destination without involvement of the connection management server.

According to this configuration, the second terminal device determines, by using the first response data in response to the second command and the first authentication information, whether to be able to actually communicate with the first terminal device by use of the first address when the second data is to be communicated with the first terminal device. If the result of the determination is affirmative, the second terminal device transmits the third command to the first address as a destination. The second terminal device can consequently communicate target second data with the target first terminal device. The second command and the third command are transmitted to the first terminal device without involvement of the connection management server. Therefore, when transmitting a command without involvement of the connection management server, the second terminal device can reliably communicate the target second data communication with the target first terminal device.

The second terminal device may further include a fourth command transmission unit configured to transmit, to the first terminal device via the connection management server, a fourth command for communicating the second data with the first terminal device by use of a second address currently assigned to the first terminal device instead of the first address if the determination unit determines that the particular terminal device is not the first terminal device. When a communication cannot be performed with the first terminal device by use of the first address, by transmitting the fourth command via the connection management server, the second terminal device can communicate the second data with the first terminal device by use of the second address currently assigned to the first terminal device.

The second command transmission unit may transmit the second command including first challenge data. The first response data may be data generated by the particular terminal device by encrypting the first challenge data using a secret key of the particular terminal device itself. The first authentication information may include a first public key of the first terminal device. The determination unit may decrypt the first response data by the first public key so as to generate first decrypted data, and may determine that the particular terminal device is the first terminal device if the first decrypted data match the first challenge data. Accordingly, it is possible to reliably determine whether the particular terminal device is the target first terminal device.

The determination unit may determine that the particular terminal device is not the first terminal device if the first response data are not received.

The first command may be a command for establishing a communication session between the first terminal device and the second terminal device. In this case, the authentication information obtaining unit may obtain the first authentication information immediately after establishment of the communication session. The phrase "immediately after establishment of the communication session" may be translated into another phrase "after transmission of the first command."

Further, the phrase may also be translated into yet another sentence "after transmission of the first command and before performance of the communication of the first data."

If the authentication information obtaining unit can obtain the first authentication information, the storage control unit may hold the first address and the first authentication information in the storage unit. If the authentication information obtaining unit cannot obtain the first authentication information, the storage control unit may also not hold the first address in the storage unit. According to the configuration, an address, which can not be determined as to whether a communication of target data with a target terminal device can be performed, is not held in the storage unit. Therefore, wasteful consumption of remaining memory space of the storage unit caused by holding such an address can be prevented.

The second terminal device may further include a public key transmission unit, a challenge data communication unit, and a command receiving unit. The public key transmission unit may transmit a second public key of the second terminal device to the first address as a destination. The challenge data communication unit may be configured to: receive second challenge data transmitted by the first terminal device to a third address of the second terminal device as a destination; encrypt the second challenge data using a secret key of the second terminal device so as to generate second response data; and transmit the second response data to the first terminal device. If second decrypted data generated by the first terminal device by decrypting the second response data using the second public key match the second challenge data, the command receiving unit may receive a fifth command transmitted by the first terminal device to the third address as a destination for communicating third data with the first terminal device. Accordingly, the first terminal device can determine, by use of the second public key, whether to be able to communicate target third data with the target second terminal device by use of the third address. If the result of the determination is affirmative, the first terminal device can transmit the fifth command. As a result, the communication of the third data can be established between the first terminal device and the second terminal device.

The first through fifth commands can be of different types or not. For example, the first command and the second command can also be of the same type, and the first command and the third command can also be of the same type.

A system including the connection management server, the first terminal device, and the second terminal device is also novel and useful. A control method and a computer program for implementing the second terminal device are also novel and useful.

The first terminal device and the second terminal device may communicate a connection request command (e.g., an INVITE command), a response command (e.g., a 200 OK command) issued in response to the connection request command, and a receipt acknowledgement command (e.g., an ACK command) transmitted if the response command is received. In this case, a communication session may be established between the first terminal device and the second terminal device by the communication of the receipt acknowledgement command.

The second terminal device may further include a connection request command transmission unit configured to transmit a connection request command to the first terminal device via the connection management server. In this case, the first command may be the receipt acknowledgement command that is transmitted if a response command in response to the connection request command is received. The second command may be the connection request command. The first response data may be included in the response command. The third command may be the receipt acknowledgement command. The fourth command may be the connection request command. The fifth command may be the receipt acknowledgement command.

The response command in response to the connection request command may include the first address of the first terminal device. In this case, the second terminal device can obtain the first address of the first terminal device by receiving the response command.

The second challenge data may be included in the connection request command. The second response data may be included in the response command.

The storage control unit may hold the first address and first authentication information in the storage unit continually for a predetermined period. Specifically, the storage control unit may delete the first address and the first authentication information after elapse of the predetermined period. In a case where a communication of the second data with the first terminal device should be performed after the communication of the first data, if the first address and the first authentication information are held in the storage unit, the second command transmission unit may also transmit the second command to the first address held in the storage unit as a destination.

(System Configuration)

An embodiment is now described by reference to the drawings. As shown in FIG. 1, a phone network system 2 has the Internet 4, an SIP server 10, a STUN (Simple Traversal of UDP through NATs) server 40, a plurality of local networks 50 and 150, and the like. The SIP server 10, the STUN server 40, the plurality of local networks 50 and 150, and the like, are connected to the Internet 4.

(Configuration of the Sip Server 10)

The SIP server 10 includes a control unit 12, a network interface 14, a program memory area 16, and a registration data memory area 18. The control unit 12 performs processing according to a program stored in the program memory area 16. The network interface 14 is connected to the Internet 4. The program memory area 16 stores a program to be executed by the control unit 12. The program memory area 16 may also store a program installed from a program storage medium or a program downloaded from the Internet 4, or the like.

The registration data memory area 18 stores registration data 20 and 22. The registration data 20 are data pertaining to a first terminal device 60, and the registration data 22 are data pertaining to the second terminal device 100. Each set of registration data 20 and 22 includes a SIPURI 30 and a global IP+port 32 which are associated with each other. The SIPURI 30 is a unique URI assigned to each terminal device utilizing an SIP. In the present embodiment, a first terminal device 60 is assigned a SIPURI "sip:t1@server.com." A second terminal device 100 is also assigned a SIPURI as is the first terminal device 60.

The global IP+port 32 designates a combination of a global IP address and a global port number. For example, the first terminal device 60 is assigned a combination of a global IP address G1 and a global port number GP1. A combination of a global IP address and a global port number is sometimes called a "global address" in the following descriptions. The second terminal device 100 is also assigned a combination of a global IP address G2 and a global port number GP2.

Each of the terminal devices 60 and 100 periodically commands the SIP server 10 to register a SIPURI and a global address of the terminal device itself. The SIP server 10 registers the registration data 20 and 22 in compliance with the commands from the respective terminal devices 60 and 100.

(Configuration of the Stun Server 40)

The STUN server 40 receives inquiry commands transmitted from the respective local networks 50 and 150. The STUN server 40 analyzes the inquiry command, thereby obtaining a combination (i.e., a global address) of a global IP address and a global port number of a source (e.g., the first terminal device 60) of the inquiry command. The STUN server 40 transmits the global address to the source of the inquiry command. The source of the inquiry command can thereby ascertain a global address assigned to the source itself.

(Configuration of the Local Network 50)

As shown in FIG. 1, the local network 50 is connected to the Internet 4 by way of a first NAT router 52. The first NAT router 52 is connected to the Internet 4 as well as to a LAN 54. The local network 50 is configured by terminal device(s) connected to the LAN 54. In the embodiment, the first terminal device 60 is connected to the LAN 54.

The first NAT router 52 performs address translation processing called NAT (Network Address Translation). The first NAT router 52 transmits data transmitted from the local network 50 to the Internet 4. In the data transmitted from the local network 50, a first combination of a local IP address and a local port number is used as a source. On that occasion, the first NAT router 52 translates the first combination, which is the source, into a second combination of a global IP address and a global port number. Conversely, if data are transmitted from the Internet 4 while taking the second combination as a destination, the first NAT router 52 translates the second combination, which is a destination, into the first combination.

(Configuration of the First Terminal Device 60)

Figure 3:
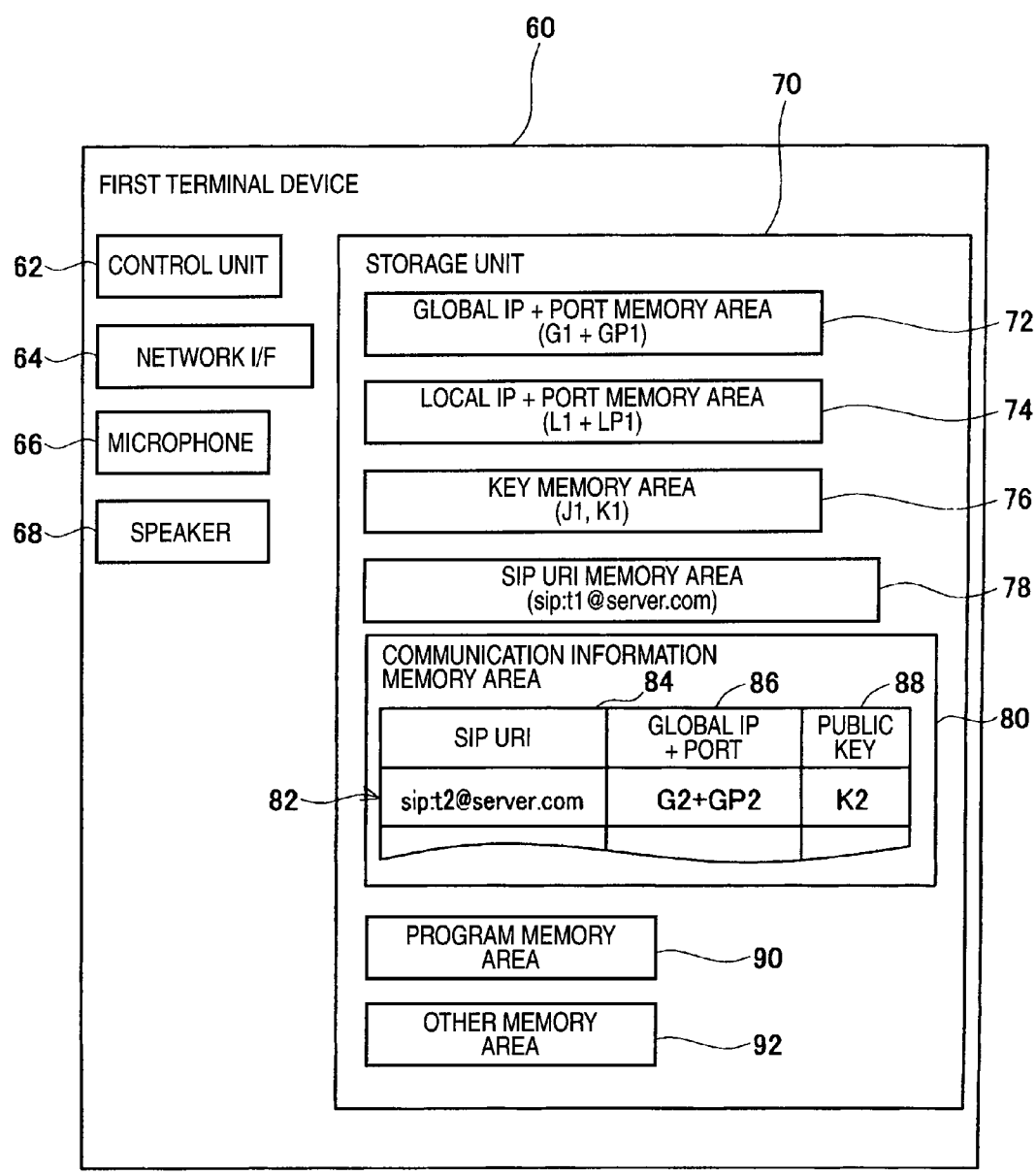
FIG. 3 shows a first terminal device according to the embodiment of the invention.

As shown in FIG. 3, the first terminal device 60 has a control unit 62, a network interface 64, a microphone 66, a speaker 68, a storage unit 70, and the like. Although not shown, a display unit, an operation unit, and the like, are also provided in the first terminal device 60. The control unit 62 performs processing in compliance with a program stored in the storage unit 70. The network interface 64 is connected to the LAN 54. The user of the first terminal device 60 can carry out a phone communication (an audio data communication) by utilization of the microphone 66 and the speaker 68.

The storage unit 70 includes a plurality of memory areas 72 to 92. The global IP+port memory area 72 stores a global address (G1+GP1) assigned to the first terminal device 60. The first terminal device 60 periodically sends an inquiry command to the STUN server 40. The first terminal device 60 can thereby obtain a global address assigned to the first terminal device itself. A global address can be stored in the global IP+port memory area 72. A local IP+port memory area 74 stores a local address (L1+LP1) assigned to the first terminal device 60. A key memory area 76 stores a secret key J1 and a public key K1 of the first terminal device 60. A SIPURI memory area 78 stores a SIPURI (sip:t1@server.com) assigned to the first terminal device 60. A communication information memory area 80 stores communication information 82. The communication information 82 is information about communication parties on the other end with which communications has been performed in the past. The communication information 82 corresponds to a combination of a SIPURI 84, a global IP+port 86, and a public key 88. In an example shown in FIG. 3, the communication information 82 is information about the second terminal device 100. This means that the first terminal device 60 carried out a communication with the second terminal device 100 as a communication party on the other end in the past. The program memory area 90 stores a program to be executed by the control unit 62. The program memory area 90 may also store a program installed from a program storage medium or a program downloaded from the Internet 4 or the like. A memory area 92 stores information other than information to be stored in the memory areas 72 to 90. Specifics of the information to be stored in the memory area 92 are described later.

(Configuration of the Local Network 150)

As shown in FIG. 1, the local network 150 is connected to the Internet 4 by way of a second NAT router 152. The second NAT router 152 is connected to the Internet 4 as well as to a LAN 154. The local network 150 is made up of respective terminal devices connected to the LAN 154. In the present embodiment, the second terminal device 100 is connected to the LAN 154.

(Configuration of the Second Terminal Device 100)

Figure 4:
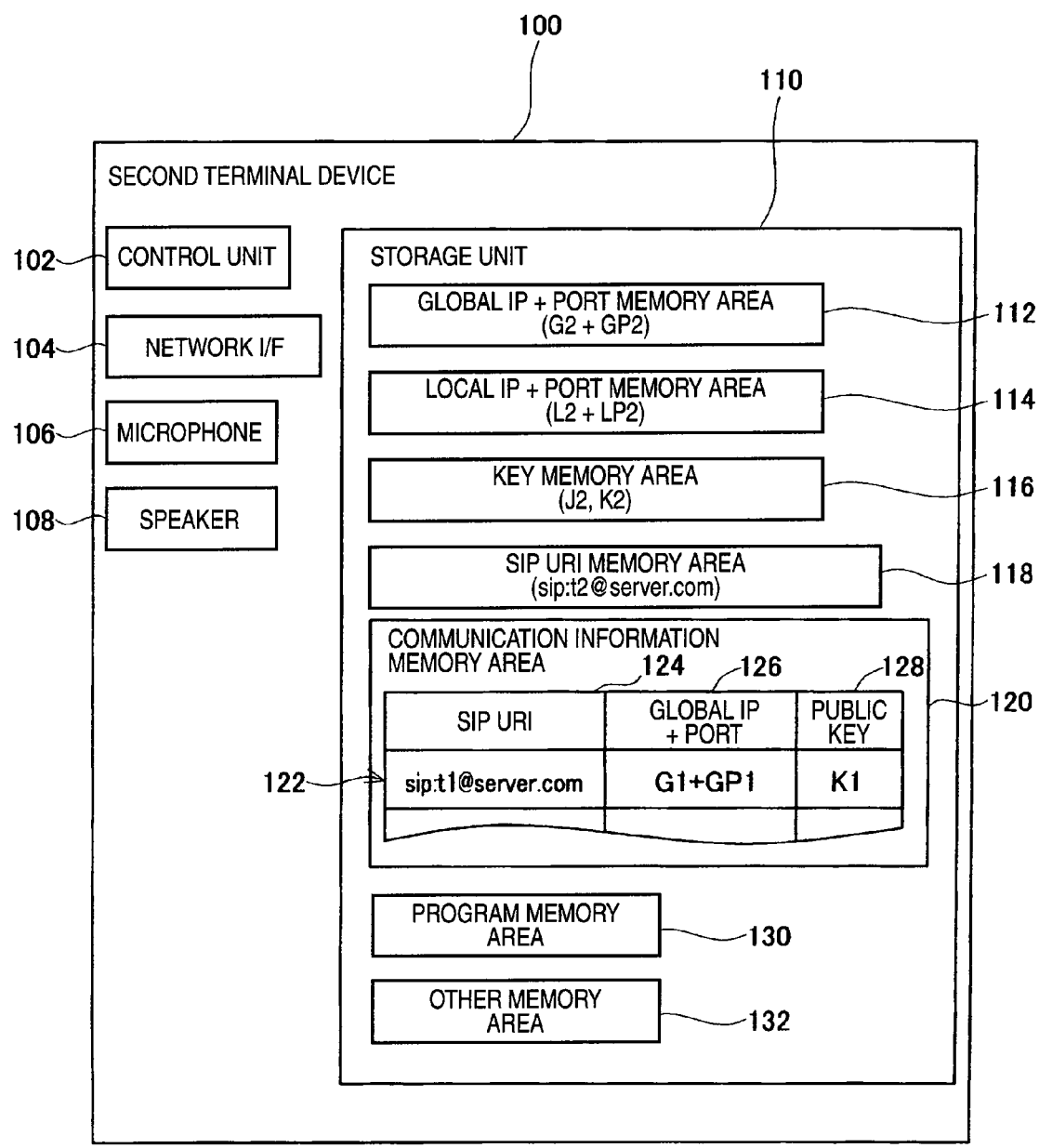
FIG. 4 shows a second terminal device according to the embodiment of the invention.

As shown in FIG. 4, the second terminal device 100 includes elements 102, 104, 106, 108, and 110 similar to the first terminal device 60. Memory areas 112 to 132 of the storage unit 110 are also similar to the first terminal device 60. Information about the second terminal device 100 is stored in the respective memory areas 112, 114, 116, and 118. For example, L2+LP2 of the local IP+port memory area 114 corresponds to a local address of the second terminal device 100. Reference symbol J2 of the key memory area 116 designates a secret key of the second terminal device 100. Reference symbol K2 designates a public key of the second terminal device 100. In the example shown in FIG. 4, communication information 122 belonging to a communication information memory area 120 corresponds to information 124, 126, and 128 about the first terminal device 60.

(General Overview of Invite Command Transmission Processing)

Figure 5:
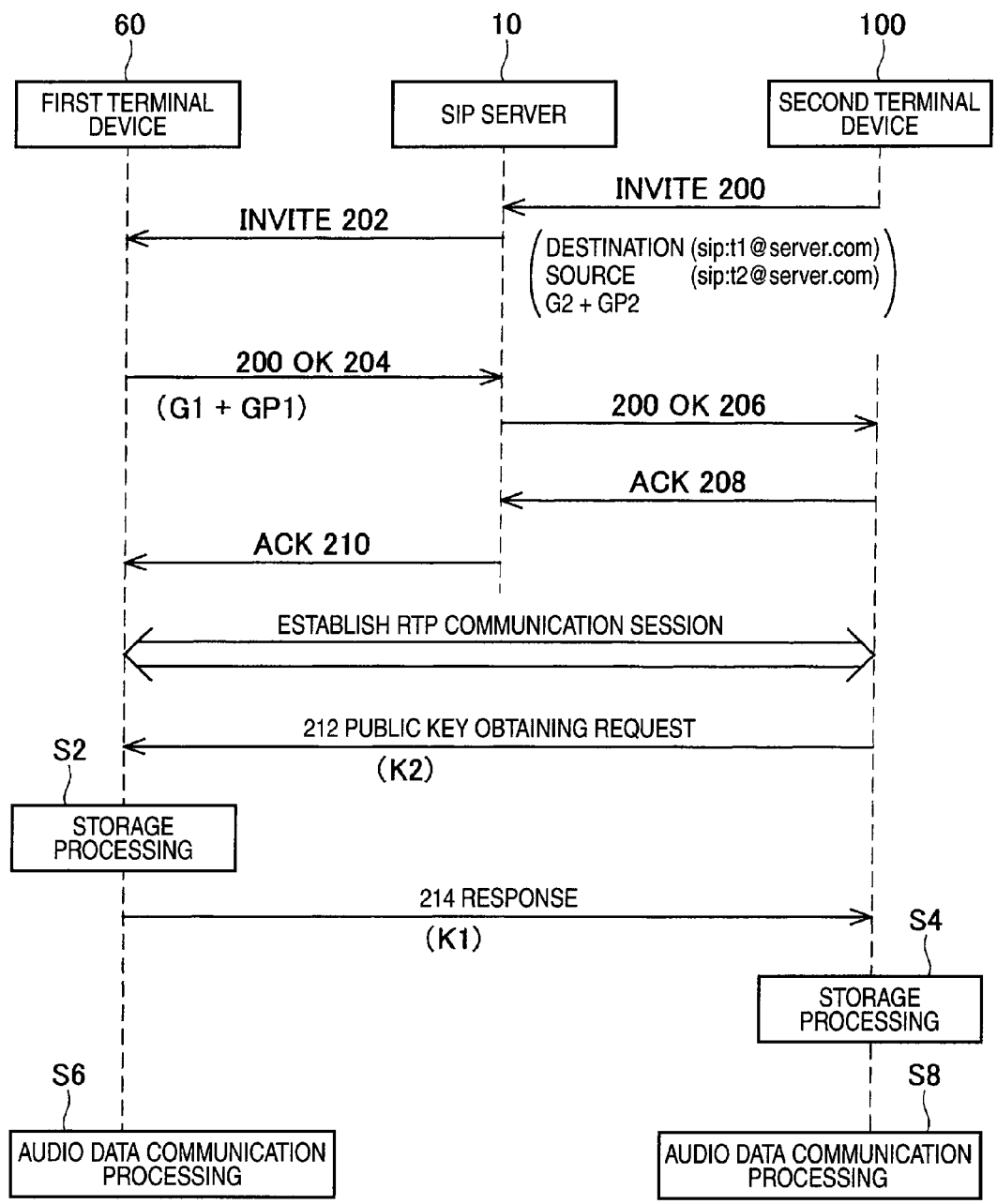
FIG. 5 shows a sequence chart employed when the second terminal device transmits an INVITE command to the first terminal device via the SIP server.

Processing performed if the second terminal device 100 transmits an INVITE command to the first terminal device 60 by way of the SIP server 10 is subsequently described with reference to FIG. 5. As shown in FIG. 5, the user of the second terminal device 100 can input a SIPURI of the first terminal device 60 by operation of an operation unit (omitted from the drawings) of the second terminal device 100. The second terminal device 100 thereby commences processing shown in FIG. 5.

The memory area 132 (see FIG. 4) of the second terminal device 100 stores an address of the SIP server 10. The second terminal device 100 transmits an INVITE command 200 to the address of the SIP server 10 as a destination. The INVITE command 200 includes a SIPURI of the first terminal device 60 that is a destination, a SIPURI of the second terminal device 100 that is a source, and a global address G2+GP2 of the second terminal device 100.

Figure 2:
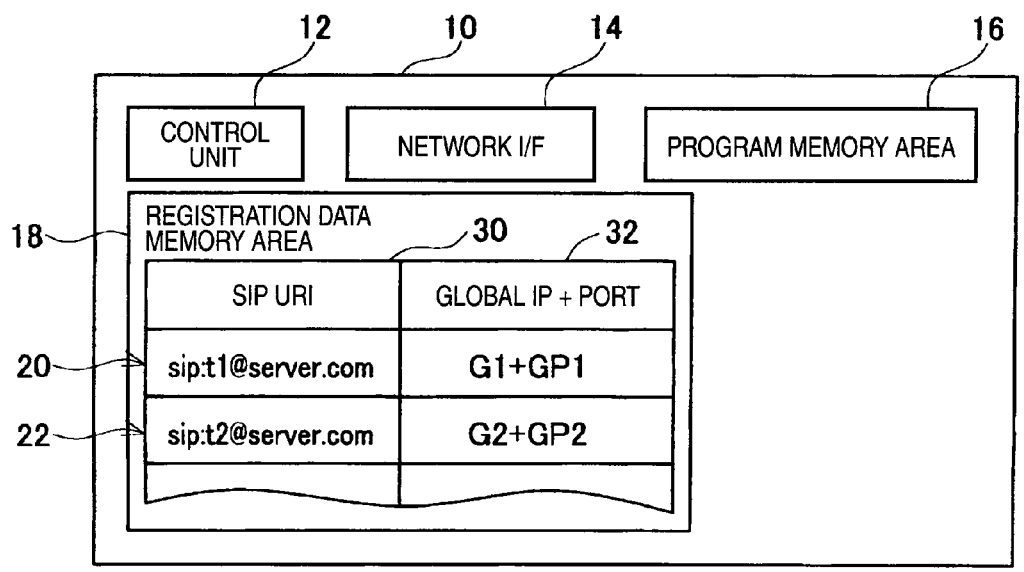
FIG. 2 shows an SIP server according to the embodiment of the invention.

The SIP server 10 receives the INVITE command 200. The SIP server 10 identifies a global address G1+GP1 associated with the SIPURI (the SIPURI of the first terminal device 60) of the destination included in the INVITE command 200, by reference the registration data memory area 18 (see FIG. 2). The SIP server 10 transmits an INVITE command 202 to the thus-identified global address G1+GP1 as a destination. The INVITE command 202 includes the same information as that of the INVITE command 200. The operation can also be expressed as the SIP server 10 transferring the INVITE command 200 transmitted from the second terminal device 100 to the first terminal device 60.

The first terminal device 60 receives the INVITE command 202. The first terminal device 60 can perceive arrival of an incoming call directed to the first terminal device itself. The first terminal device 60; for example, outputs predetermined sound or lets predetermined light illuminate. These operations are hereinafter called call request notification. The user can realize origination of a phone call as a result of performance of call request notification. If the user performs call initiation operation (e.g., actuation of a hook key) in the middle of performance of call request notification, the first terminal device 60 next transmits a 200 OK command 204 to the SIP server 10. The 200 OK command 204 includes the global address G1+GP1 of the first terminal device 60. On receipt of the 200 OK command 204, the SIP server 10 transfers a 200 OK command 206 to the second terminal device 100.

On receipt of the 200 OK command 206, the second terminal device 100 transmits an ACK command 208 to the SIP server 10. On receipt of the ACK command 208, the SIP server 10 transfers an ACK command 210 to the first terminal device 60. The first terminal device 60 receives the ACK command 210. On receipt of the ACK command 210, the first terminal device 60 establishes an RTP (Real-time Transport Protocol) communication session between the first terminal device 60 and the second terminal device 100.

In the course of the RTP communication session being established, the first terminal device 60 and the second terminal device 100 perform a data communication while taking either of the global address G1+GP1 or the global address G2+GP2 as a destination or source and taking a remaining one global address as the source or destination. For example, on receipt of the INVITE command 202, the first terminal device 60 can obtain the global address G2+GP2 of the second terminal device 100. In the middle of the RTP communication session being established, the first terminal device 60 transmits data (for example, a response 214 to be described later or audio data) to, as a destination, the global address G2+GP2 of the second terminal device 100. On receipt of the 200 OK command 206, the second terminal device 100 can obtain the global address G1+GP1 of the first terminal device 60. In the middle of the RTP communication session being established, the second terminal device 100 transmits data (for example, a public key obtaining request 212 to be described later or audio data) to, as a destination, the global address G1+GP1 of the first terminal device 60. A data communication performed between the first terminal device 60 and the second terminal device 100 in the course of the RTP communication session being established does not pass through the SIP server 10.

Immediately after establishment of the RTP communication session, the second terminal device 100 transmits the public key obtaining request 212 to, as a destination, the global address G1+GP1 of the first terminal device 60. The public key obtaining request 212 includes the public key K2 of the second terminal device 100. On receipt of the public key obtaining request 212, the first terminal device 60 performs storage processing for storing into the communication information memory area 80 the SIPURI, the global address G2+GP2, and the communication information 82 (see FIG. 3) associated with the public key K2, all of which pertain to the second terminal device 100 (S2).

The first terminal device 60 next transmits the response signal 214 to, as a destination, the global address G2+GP2 of the second terminal device 100. The response 214 includes the public key K1 of the first terminal device 60. On receipt of the response 214, the second terminal device 100 performs storage processing for storing, in the communication information memory area 120, the SIPURI, the global address G1+GP1, and the communication information 122 (see FIG. 4) associated with the public key K1, all of which pertaining to the first terminal device 60 (S4).

The first terminal device 60 performs audio data communication processing (S6). Specifically, the first terminal device 60 transmits the audio data input to the microphone 66 to the second terminal device 100 and also outputs, by way of the speaker 68, audio data originated from the second terminal device 100. Likewise, the second terminal device 100 also performs audio data communication processing (S8). A phone communication can be established between the first terminal device 60 and the second terminal device 100.

Subsequently, with reference to FIG. 6, there is described processing by means of which the second terminal device 100 again transmits the INVITE command to the first terminal device 60 after disconnection of the RTP communication session thus established in FIG. 5 (i.e., after completion of a phone communication). The user of the second terminal device 100 operates an operation unit (not shown) of the second terminal device 100, thereby becoming possible to enter the SIPURI of the first terminal device 60. The second terminal device 100 thereby commences processing shown in FIG. 6.

The second terminal device 100 determines whether or not the communication information 122 (see FIG. 4) including the SIPURI of the first terminal device 60 input by the user is stored in the communication information memory area 120. If an affirmative determination is rendered, the second terminal device 100 generates a transmission-side challenge code 224. The second terminal device 100 then transmits an INVITE command 220 to, as a destination, the global address G1+GP1 included in the communication information 122. The INVITE command 220 does not pass through the SIP server 10. The INVITE command 220 includes the SIPURI of the first terminal device 60 serving as a destination, the SIPURI of the second terminal device 100 serving as a source, the global address G2+GP2 of the second terminal device 100, a flag 222, and the transmission-side challenge code 224. The flag 222 is a flag having a function (hereinafter called a "direct communication function") of carrying out communication of the INVITE command, the 200 OK command, and the ACK command without involvement of the SIP server 10.

The first terminal device 60 receives the INVITE command 220. The first terminal device 60 performs call request notification (e.g., outputting of predetermined sound). If the user performs call initiation operation in the middle of performance of call request notification, the first terminal device 60 performs response code generation processing (S10). The first terminal device 60 encrypts the transmission-side challenge code 224 included in the INVITE command 220 by utilization of the secret key J1 (see FIG. 3) of the first terminal device itself, thereby generating a receiving-side response code 230. The first terminal device 60 next transmits a 200 OK command 226 to, as a destination, the global address G2+GP2 included in the INVITE command 220. The 200 OK command 226 does not pass through the SIP server 10. The 200 OK command 226 includes a flag 228 showing that the 200 OK command 226 is compatible with the direct communication function and a receiving-side response code 230.

The second terminal device 100 receives the 200 OK command 226. The second terminal device 100 decrypts the receiving-side response code 230 included in the 200 OK command 226 by utilization of the public key K1 included in the communication information 122 (see FIG. 4), thereby generating decrypted data. The second terminal device 100 performs determination processing for determining whether or not a match exists between the transmission-side challenge code 224 and the decrypted data (S12). If a match exists between the two sets of data, the second terminal device 100 transmits an ACK command 232 to, as a destination, the global address G1+GP1. The ACK command 232 does not pass through the SIP server 10. The ACK command 232 includes a flag 234 showing that the ACK command is compatible with the direct communication function.

The first terminal device 60 receives the ACK command 232. An RTP communication session is thereby established between the first terminal device 60 and the second terminal device 100. The first terminal device 60 and the second terminal device 100 perform audio data communication processing (S14 and S16).

Figure 6:
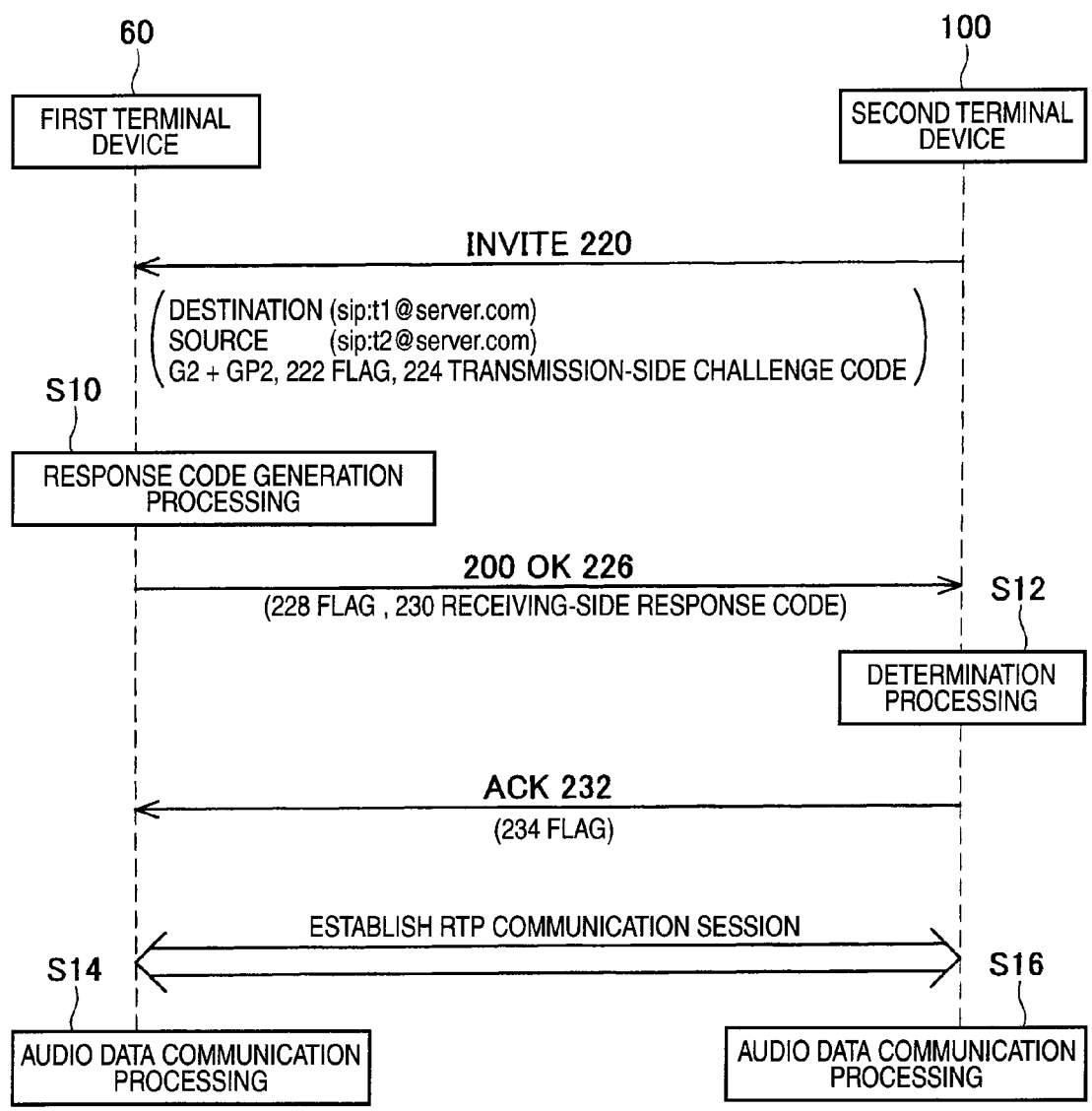
FIG. 6 shows a sequence chart employed when the second terminal device transmits an INVITE command to the first terminal device without involvement of the SIP server (when only the second terminal device performs challenge authentication)
Figure 7:
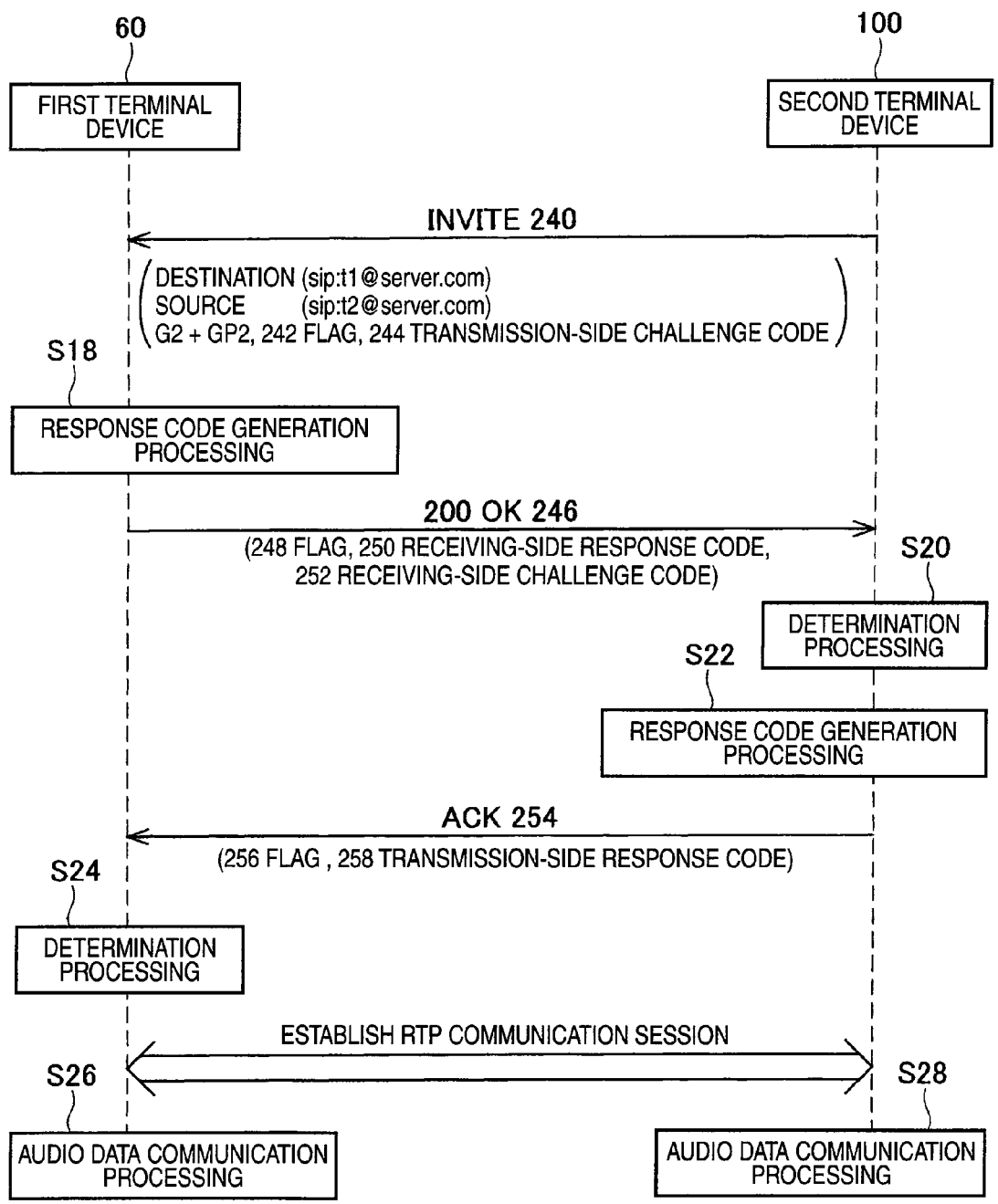
FIG. 7 shows a sequence chart employed when the second terminal device transmits an INVITE command to the first terminal device without involvement of the SIP server (when both the first terminal device and the second terminal device perform challenge authentication)

In the example shown in FIG. 6, the second terminal device 100 that transmits an INVITE command performs challenge authentication, whilst the first terminal device 60 that receives the INVITE command does not perform challenge authentication. In the present embodiment, there is a case where the first terminal device 60 that receives an INVITE command will perform challenge authentication. For example, the user of the first terminal device 60 operates the operation unit (omitted from the drawings) of the first terminal device 60, thereby being able to select whether or not to perform challenge authentication with respect to the source of an INVITE command (e.g., the second terminal device 100). If performance of challenge authentication is selected, a check setting ON is stored in the memory area 92 (see FIG. 3) of the first terminal device 60. Meanwhile, if nonperformance of challenge authentication is selected, a check setting OFF is stored in the memory area 92 of the first terminal device 60. If the check setting is ON, the first terminal device 60 that receives an INVITE command performs challenge authentication. FIG. 7 shows a sequence chart of processing performed in this case. Check settings are stored also in the memory area 132 of the second terminal device 100 (see FIG. 4) as is the case with the first terminal device 60.

This example is analogous to the example shown in FIG. 6 in terms of the second terminal device 100 transmitting an INVITE command 240 including a flag 242, a transmission-side challenge code 244, and the like. Further, the example is also analogous to the example shown in FIG. 6 in terms of the first terminal device 60 performing response code generation processing (S18), to thus generate a receiving-side response code 250. When compared with the example shown in FIG. 6, the first terminal device 60 additionally generates a receiving-side challenge code 252. The first terminal device 60 then transmits, to the second terminal device 100, a 200 OK command 246 including a flag 248 showing that the first terminal device is compatible with a direct communication function, a receiving-side response code 250, and a receiving-side challenge code 252.

The case is also analogous to the case shown in FIG. 6 even in term of the second terminal device 100 performing determination processing (S20). When compared with the example shown in FIG. 6, the second terminal device 100 performs response code generation processing (S22). Specifically, the second terminal device 100 utilizes a secret key J2 (see FIG. 4) of the second terminal device itself, thereby encrypting the receiving-side challenge code 252 included in the 200 OK command 246, thereby generating a transmission-side response code 258. The second terminal device 100 then transmits to the first terminal device 60 an ACK command 254 including a flag 256 showing that the second terminal device is compatible with a direct communication function and a transmission-side response code 258.

The first terminal device 60 receives the ACK command 254. By utilization of the public key K2 included in the communication information 82 (see FIG. 3), the first terminal device 60 decrypts the transmission-side response code 258 included in the ACK command 254, thereby generating decrypted data. The first terminal device 60 then performs determination processing for determining whether or not the receiving-side challenge code 252 matches the decrypted data (S24). If a match exists between the two sets of data, the first terminal device 60 starts carrying out a data (specifically audio data) communication. Specifically, if an affirmative determination is made through determination processing of S24, an RTP communication session comes to be established. The first terminal device 60 and the second terminal device 100 carry out audio data communication processing (S26 and S28).

(Invite Command Transmission Processing of the Terminal Device)

Figure 8:
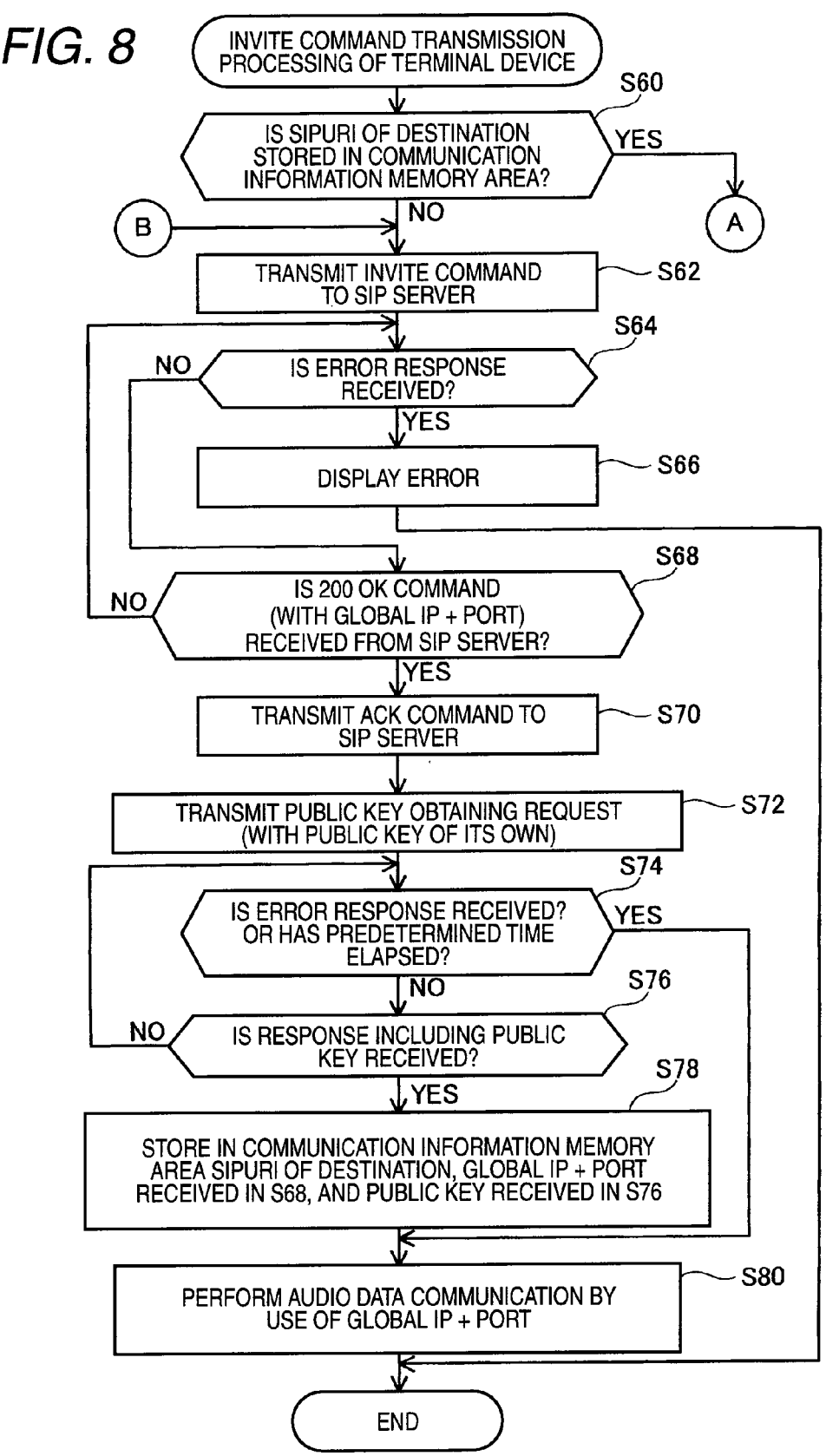
FIG. 8 shows a flowchart of INVITE command transmission processing of the terminal device.
Figure 9:
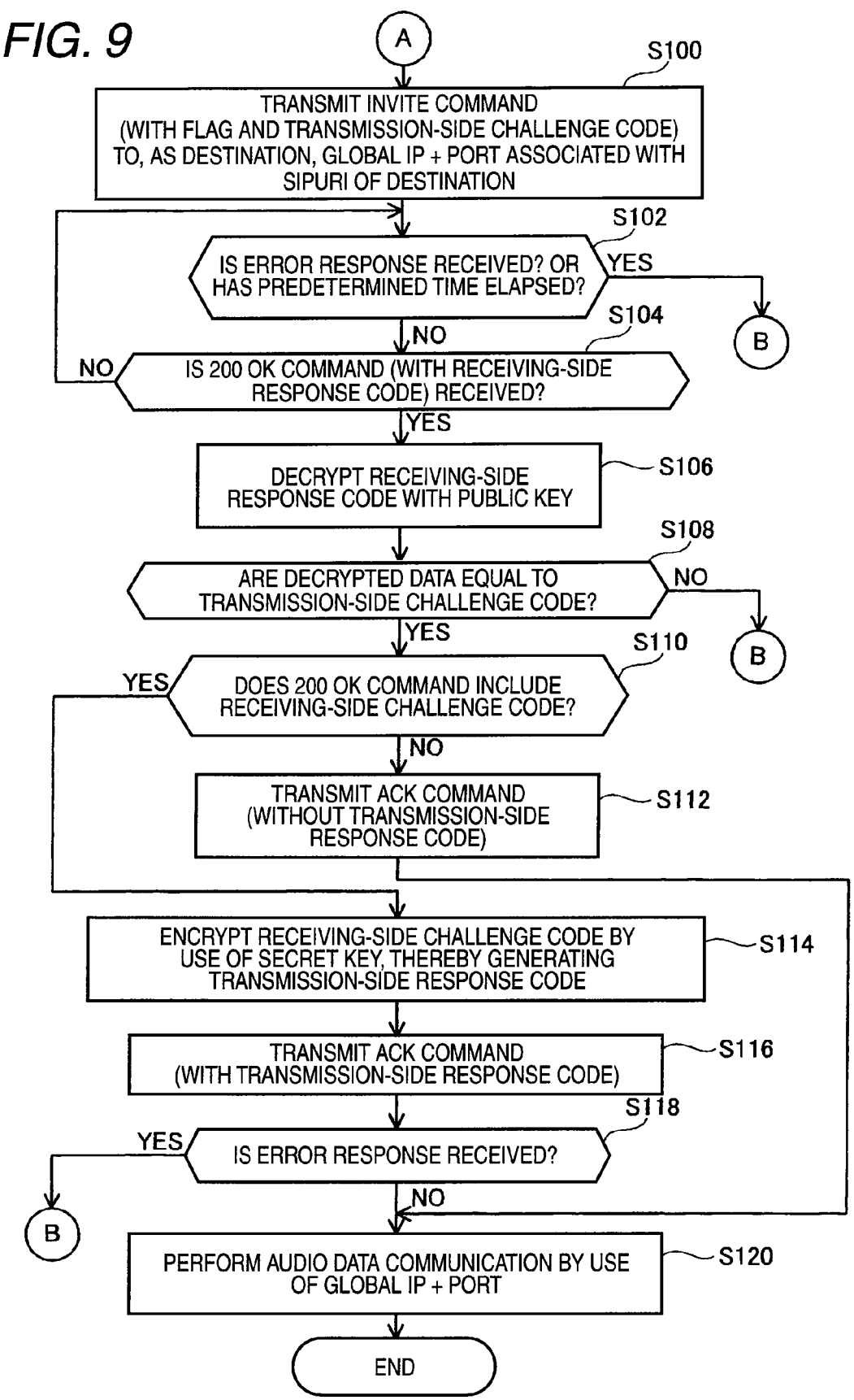
FIG. 9 shows a flowchart continued from FIG. 8.

Processing performed by the control unit 102 (see FIG. 4) of the second terminal device 100 is subsequently described in detail. The control unit 62 (see FIG. 3) of the first terminal device 60 performs processing similar to that of the control unit 102 of the second terminal device 100. INVITE command transmission processing performed by the control unit 102 is first described with reference to FIGS. 8 and 9. Processing shown in FIGS. 8 and 9 is triggered by entry of SIPURI of the destination of an INVITE command performed by the user.

The control unit 102 determines whether or not communication information including the SIPURI of a destination of the INVITE command input by the user is stored in the communication information memory area 120 (see FIG. 4) (S60). If the result of S60 is YES, processing proceeds to S100 shown in FIG. 9. If the result of S60 is NO, processing proceeds to S62. In S62, the control unit 102 transmits an INVITE command to the SIP server 10.

The control unit 102 monitors receipt of an error response as an answer to the INVITE command transmitted in S62 (S64). If the error response is received (S64: YES), the control unit 102 lets an unillustrated display unit display an error (S66). In this case, INVITE command transmission processing ends.

The control unit 102 monitors receipt of the 200 OK command as an answer to the INVITE command transmitted in S62 (S68). If the 200 OK command is received (S68: YES), the control unit 102 transmits an ACK command to the SIP server 10 (S70). An RTP communication session is consequently established between the destination of the INVITE command (e.g., the first terminal device 60) and the second terminal device 100. The 200 OK command received in S68 includes a global address of the destination of the INVITE command. The control unit 102 transmits data (e.g., a public key obtaining request in S72 or audio data in S80) to, as a destination, the global address in the course of the RTP communication session being established.

The control unit 102 transmits a public key obtaining request including the public key K2 of the second terminal device 100 (S72). The control unit 102 monitors receipt of an error response as an answer to the public key obtaining request transmitted in S72 (S74). The control unit 102 monitors in S74 elapse of a predetermined period of time since the public key obtaining request was transmitted in S72. If the error response is received (S74: YES), processing proceeds to S80 by skipping S78 to be described later.

The control unit 102 monitors receipt of a response including a public key as an answer to the public key obtaining request transmitted in S72 (S76). If the response is received (S76: YES), the control unit 102 stores, in the communication information memory area 120, communication information (e.g., communication information 122 (see FIG. 4)) with which there are associated SIPURI of a destination of the INVITE command input by the user, a global address of the destination of the INVITE command included in the 200 OK command received in S68, and a public key included in the response received in S76 (S78). If processing of S78 ends, processing proceeds to S80. The control unit 102 carries out, in S80, an audio data communication by utilization of the established RTP communication session.

As mentioned previously, if the result of S60 is YES (if the SIPURI of the destination of the INVITE command input by the user is stored in the communication information memory area 120 (see FIG. 4)), processing proceeds to S100 shown in FIG. 9. The control unit 102 makes, in S100, a reference to the communication information memory area 120, thereby identifying a global address associated with the SIPURI of the destination of the INVITE command input by the user. The control unit 102 also randomly obtains numerals, thereby generating a transmission-side challenge code. The control unit 102 then transmits an INVITE command to, as a destination, the thus-identified global address. The INVITE command includes a flag showing compatibility with a direct communication function and the transmission-side challenge code.

The control unit 102 monitors receipt of an error response as an answer to the INVITE command transmitted in S100 (S102). The control unit 102 also monitors, in S102, elapse of a predetermined period of time since the INVITE command was transmitted in S100. If the predetermined period elapses (S102: YES), the control unit 102 proceeds to S62 shown in FIG. 8 and transmits the INVITE command to the SIP server 10.

The control unit 102 also monitors the 200 OK command being received as an answer to the INVITE command transmitted in S100 (S104). If the 200 OK command is received (S104: YES), the control unit 102 identifies a public key (e.g., K1) associated with the SIPURI of the destination of the INVITE command input by the user by reference to the communication information memory area 120. The control unit 102 decrypts the receiving-side response code included in the 200 OK command received in S104 by utilization of the identified public key, thereby generating decrypted data (S106). The control unit 102 determines whether or not the decrypted data match the transmission-side challenge code transmitted in S100 (S108). If the result of S108 is NO, the control unit 102 proceeds to S62 shown in FIG. 8 and transmits an INVITE command to the SIP server 10.

If the result of S108 is YES, the control unit 102 determines whether or not the 200 OK command received in S104 includes the receiving-side challenge code (S110). If the result of S110 is NO, the control unit 102 transmits an ACK command to, as a destination, the global address identified in S100 (the global address associated with the SIPURI of the destination of the INVITE command input by the user) (S112). The ACK command transmitted herein does not include any transmission-side response code. As a result of the ACK command being transmitted in S112, an RTP communication session is established between the destination of the INVITE command and the second terminal device 100. If processing of S112 ends, processing proceeds to S120. The control unit 102 carries out, in S120, an audio data communication by utilization of the thus-established RTP communication session.

Meanwhile, if the result of S110 is YES, the control unit 102 encrypts the receiving-side challenge code by utilization of the secret key J2 (see FIG. 4), thereby generating a transmission-side response code (S114). The control unit 102 transmits an ACK command including the transmission-side response code generated in S114 to, as a destination, the global address identified in S100 (S116). The control unit 102 monitors receipt of an error response as an answer to the ACK command transmitted in S116 (S118). If the error response is not received (S118: NO) (e.g., in a case where a predetermined period of time has elapsed without receiving an error response since the ACK command was transmitted in S116), the control unit 102 proceeds to S120, where an audio data communication is carried out. Meanwhile, if the error response is received (S118: YES), the control unit 102 proceeds to S62 shown in FIG. 8, where an INVITE command is transmitted to the SIP server 10.

(Invite Command Reception Processing of the Terminal Device)

Figure 10:
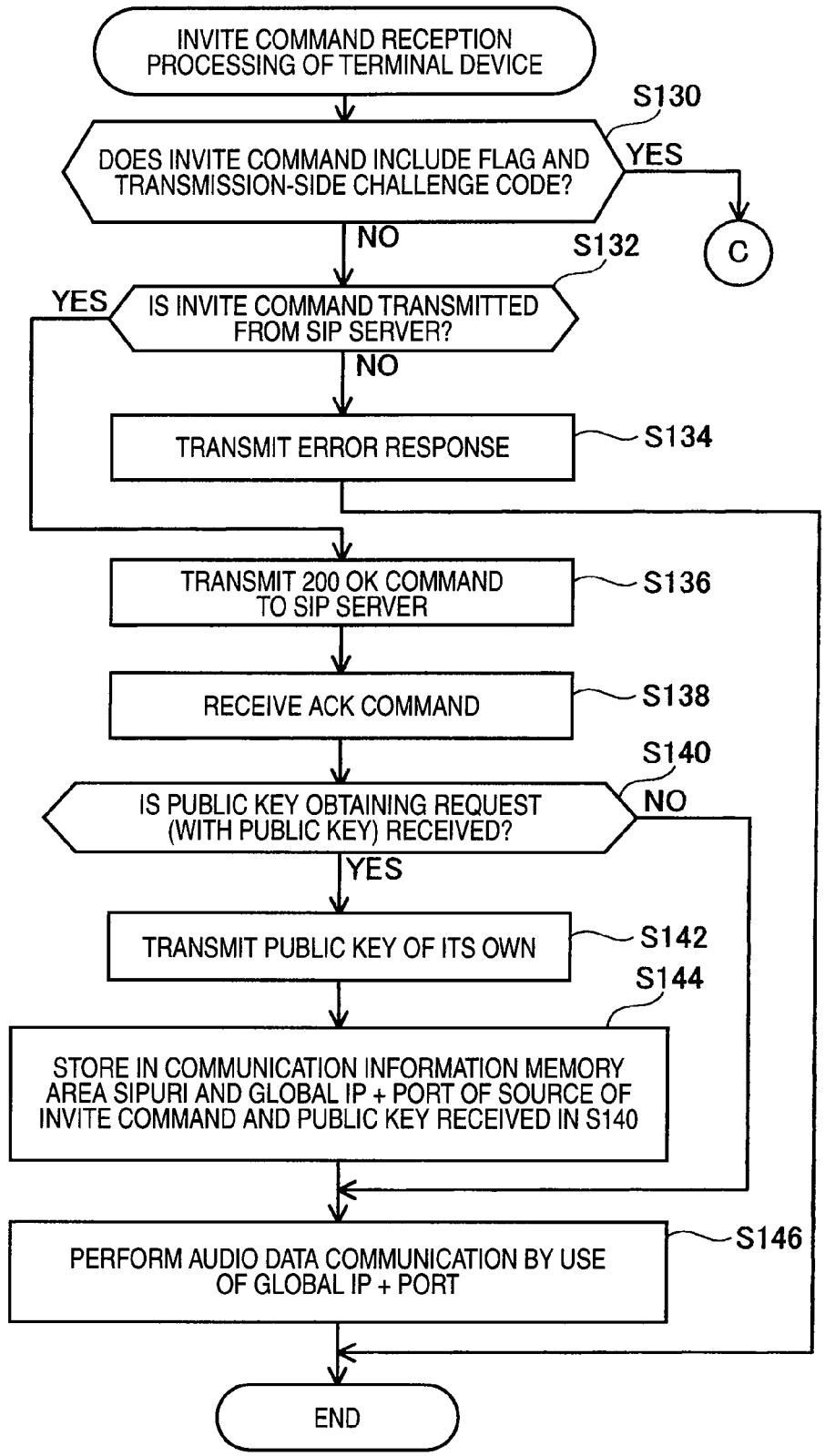
FIG. 10 shows a flowchart of INVITE command reception processing of the terminal device.
Figure 11:
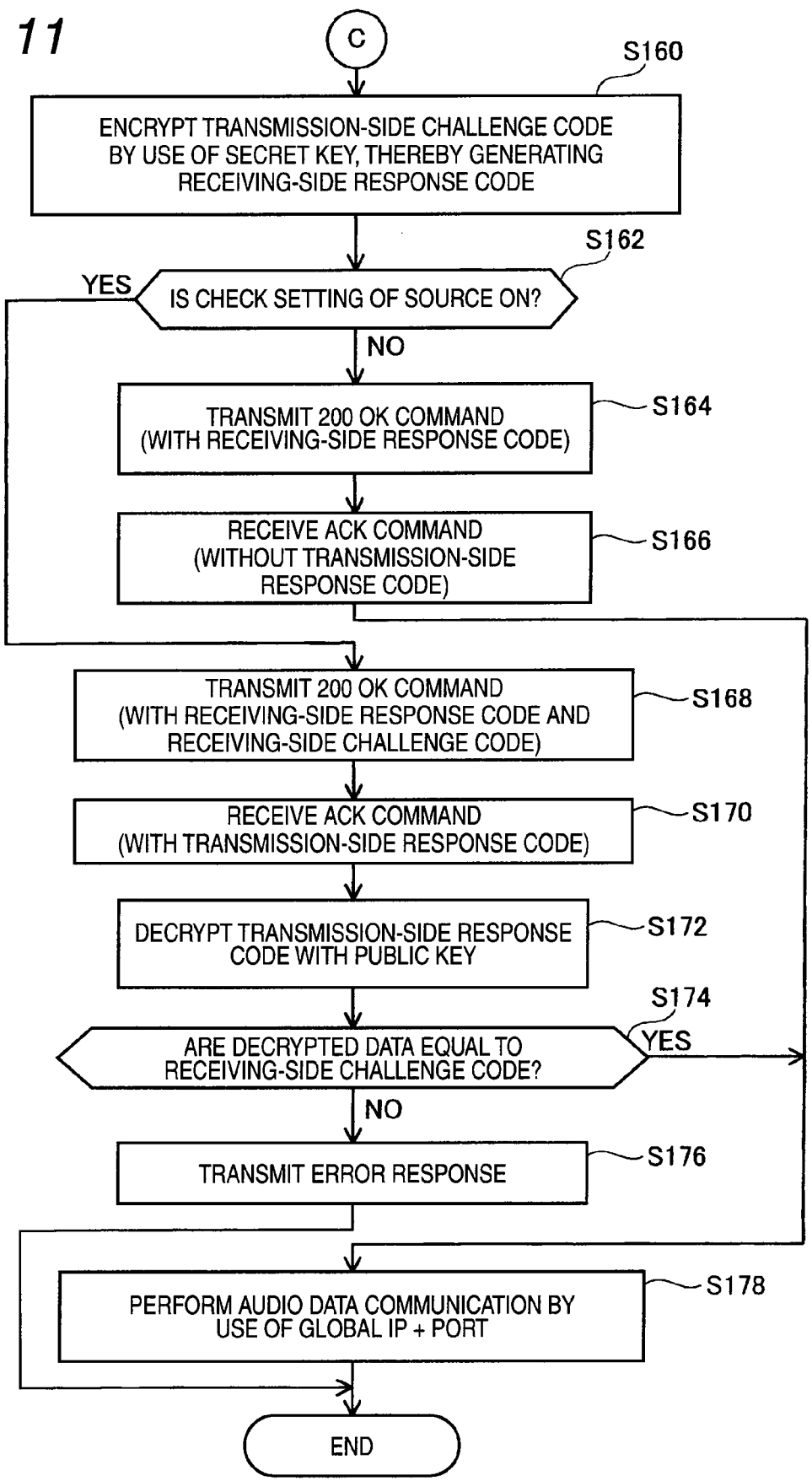
FIG. 11 shows a flowchart continued from FIG. 10.

INVITE command reception processing performed by the control unit 102 of the second terminal device 100 is subsequently described. FIGS. 10 and 11 show flowcharts of INVITE command reception processing. Processing shown in FIGS. 10 and 11 is triggered by receipt of an INVITE command.

The control unit 102 determines whether or not the received INVITE command includes a flag showing compatibility with a direction communication function and the transmission-side challenge code (S130). Specifically, as a result of the first terminal device 60 performing processing of S100 shown in FIG. 9, the control unit 102 determines whether or not the INVITE command transmitted to, as a destination, the global address G2+GP2 of the second terminal device 100 is received. If the result of S130 is YES, processing proceeds to S160 shown in FIG. 11. If the result of S130 is NO, processing proceeds to S132.

The control unit 102 determines, in S132, whether or not the received INVITE command is transmitted from the SIP server 10. If the result of S132 is NO, the control unit 102 transmits an error response to the source of the received INVITE command (S134). In this case, INVITE command reception processing ends.

Though not illustrated in the flowchart, the control unit 102 performs call request notification if the result of S132 is YES. If the user has performed call initiation operation, the control unit 102 transmits a 200 OK command to the SIP server 10 (S136). The SIP server 10 transfers the thus-transmitted 200 OK command to the source of the INVITE command (e.g., the first terminal device 60). The source of the INVITE command transmits an ACK command to the SIP server 10 (see S70 shown in FIG. 8). The SIP server 10 transfers the thus-transmitted ACK command to the second terminal device 100. The second terminal device 100 receives the ACK command (S138). An RTP communication session is consequently established between the source of the INVITE command and the second terminal device 100.

During a predetermined period of time that elapses since the ACK command was received in S138 (since the RTP communication session was established), the control unit 102 monitors reception of a public key obtaining request (S140). If the public key obtaining request is not received (S140: NO) (e.g., if the predetermined period of time has elapsed without reception of the public key obtaining request since the ACK command was received in S138), the control unit 102 proceeds to S146, where an audio data communication is carried out by utilization of the established RTP communication session (S146).

Meanwhile, if the public key obtaining request is received (S140: YES), the control unit 102 transmits a response including the public key K2 of the second terminal device 100 (S142). The control unit 102 then stores, in the communication information memory area 120 (see FIG. 4), communication information with which there are associated the SIPURI of the source included in the received INVITE command, the global address of the source included in the received INVITE command, and the public key included in the public key obtaining request received in S140 (S144). After completion of processing of S144, the control unit 102 carries out an audio data communication by utilization of the established RTP communication session (S146).

Though not illustrated in the flowchart, the control unit 102 performs call request notification if the result of S130 is YES. If the user has performed call initiation operation, the control unit 102 encrypts the transmission-side challenge code included in the received INVITE command by utilization of the secret key J2 (see FIG. 4), thereby generating a receiving-side response code (S160). The control unit 102 then determines whether or not a check setting stored in the memory area 132 is ON (S162). If the result of S162 is NO, processing proceeds to S164. On the contrary, if the result of S162 is YES, processing proceeds to S168.

The received INVITE command includes a global address of the source of the INVITE command. The control unit 102 transmits, in S164, a 200 OK command including the receiving-side response code generated in S160 to, as a destination, the global address of the source of the INVITE command (S164). The thus-transmitted 200 OK command does not include any receiving-side challenge code. On receipt of the 200 OK command transmitted in S164, the source of the INVITE command performs determination processing (see S108 shown in FIG. 9). If an affirmative determination result is obtained, the source of the INVITE command transmits an ACK command to the second terminal device 100 (see S112 shown in FIG. 9). The second terminal device 100 consequently receives the ACK command (S166). The thus-received ACK command does not include any transmission-side response code. As a result of the ACK command being received by the second terminal device 100, an RTP communication session is established between the source of the INVITE command and the second terminal device 100. The control unit 102 carries out an audio data communication by utilization of the thus-established RTP communication session (S178).

On the contrary, if the result of S162 is YES, the control unit 102 generates a receiving-side challenge code. The control unit 102 then transmits the receiving-side response code generated in S160 and a 200 OK command including the receiving-side challenge code to, as a destination, the global address of the source of the INVITE command (S168). On receipt of the 200 OK command transmitted in S168, the source of the INVITE command performs determination processing (see S108 shown in FIG. 9). If an affirmative determination result is obtained, the source of the INVITE command transmits an ACK command including a transmission-side response code to the second terminal device 100 (see S116 shown in FIG. 9). The second terminal device 100 consequently receives the ACK command (S170).

On receipt of the ACK command in S170, the control unit 102 identifies a public key associated with a SIPURI of the source of the INVITE command by reference to the communication information memory area 120. By utilization of the thus-identified public key, the control unit 102 decrypts the transmission-side response code included in the ACK command received in S170, thereby generating decrypted data (S172). The control unit 102 determines whether or not the decrypted data match the receiving-side challenge code transmitted in S168 (S174). If the result of S174 is NO, the control unit 102 transmits an error response. INVITE command reception processing ends in this case. Meanwhile, if the result of S174 is YES, the control unit 102 carries out an audio data communication by utilization of the established RTP communication session (S178).

(Communication Information Management Processing of the Terminal Device)

Communication information management processing (a flowchart is omitted from the drawings) performed by the control unit 102 is subsequently described. The control unit 102 manages a time that has elapsed since the communication information was stored, in connection with respective pieces of communication information (e.g., communication information 122) stored in the communication information memory area 120. If there is communication information whose elapsed time has reached a predetermined time, the control unit 102 deletes the communication information from the communication information memory area 120. This makes it possible to prevent wasteful consumption of remaining memory space of the storage unit 110, which would otherwise be caused as a result of a plurality of pieces of communication information are continually stored in the communication information memory area 120.

The phone network system 2 of the present embodiment has been described in detail. According to the present embodiment, when performing a first phone communication with the first terminal device 60, the second terminal device 100 stores the global address G1+GP1 and the public key K1 of the first terminal device 60 (see S78 shown in FIG. 8). After having completed the first phone communication, the second terminal device 100 transmits an INVITE command to, as a destination, the global address G1+GP1 of the first terminal device 60 if the phone communication with the first terminal device 60 is to be resumed. The INVITE command includes a transmission-side challenge code (see S100 shown in FIG. 9). By utilization of the receiving-side response code and the public key K1 included in the 200 OK command, the second terminal device 100 determines whether or not to be able to carry out an actual phone communication with the first terminal device 60 by use of the global address G1+GP1 (see S108 shown in FIG. 9). If an affirmative determination result is obtained, the second terminal device 100 transmits an ACK command to, as a destination, the global address G1+GP1 (see S112 and S116 shown in FIG. 9). The second terminal device 100 can consequently resume the phone communication with the target first terminal device 60. If the phone communication between the second terminal device 100 and the first terminal device 60 is to be resumed, the INVITE command, the 200 OK command, and the ACK command are communicated without involvement of the SIP server 10. The configuration of the present embodiment makes it possible for the second terminal device 100 to resume the phone communication with the target first terminal device 60 by communicating the commands (the INVITE command, the 200 OK command, and the ACK command) without involvement of the SIP server 10.

If the phone communication with the first terminal device 60 is to be resumed, the second terminal device 100 transmits the INVITE command by way of the SIP server 10 when a communication cannot be performed with the first terminal device 60 by use of the global address G1+GP1 (if the result of S108 shown in FIG. 9 is NO) (see S62 shown in FIG. 8). The second terminal device 100 can thereby perform the phone communication with the first terminal device 60 by use of the global address currently assigned to the first terminal device 60 in place of the global address G1+GP1.

If the public key K1 of the first terminal device 60 cannot be obtained (if the result of S74 shown in FIG. 8 is YES), the second terminal device 100 skips S78 and does not store the global address G1+GP1 of the first terminal device 60. Since the global address for which challenge authentication cannot be performed is not stored in the storage unit 70, wasteful consumption of remaining memory space of the storage unit 70, which would otherwise be caused by such an address, can be prevented.

In the present embodiment, if a first phone communication is carried out by means of transmission of an INVITE command from the second terminal device 100 to the first terminal device 60, the first terminal device 60 can also obtain the public key K2 of the second terminal device 100. Accordingly, if the phone communication with the second terminal device 100 is to be resumed, the first terminal device 60 can determine whether or not to be able to actually perform a phone communication with the second terminal device 100 by use of the global address G2+GP2 of the second terminal device 100, by utilization of the public key K2. If the first terminal device 60 should resume the phone communication with the second terminal device 100, the INVITE command, the 200 OK command, and the ACK command are communicated without involvement of the SIP server 10. The first terminal device 60 can resume the phone communication with the target second terminal device 100 by transmitting the commands without involvement of the SIP server 10.

As can be seen from the foregoing, the first terminal device 60, the second terminal device 100, and the SIP server 10 correspond to the first terminal device, the second terminal device, and the connection management server, respectively. If the second terminal device 100 transmits an INVITE command to the SIP server 10, processing for transmitting an INVITE command in S62 shown in FIG. 8 and processing for transmitting an ACK command in S70 in FIG. 8 correspond to processing performed by the first command transmission unit. Meanwhile, if the second terminal device 100 receives an INVITE command from the SIP server 10, processing for transmitting a 200 OK command in S136 shown in FIG. 10 corresponds to processing performed by the first command transmission unit. Audio data communicated in S80 shown in FIGS. 8 and S146 shown in FIG. 10 corresponds to first data. If the second terminal device 100 transmits an INVITE command to the SIP server 10, processing for receiving a response including a public key in S76 shown in FIG. 8 corresponds to processing performed by the authentication information obtaining unit. Meanwhile, if the second terminal device 100 receives an INVITE command from the SIP server 10, processing for receiving a public key obtaining request including a public key in S140 shown in FIG. 10 corresponds to processing performed by the authentication information obtaining unit. Processing for storing communication information in S78 shown in FIG. 8 and S144 shown in FIG. 10 corresponds to processing performed by the storage control unit.

Processing for transmitting an INVITE command in S100 shown in FIG. 9 corresponds to processing performed by the second command transmission unit, and processing for performing challenge authentication in S108 shown in FIG. 9 corresponds to processing performed by the determination unit. If the result of S108 shown in FIG. 9 is YES, processing for transmitting an ACK command in S112 and S116 shown in FIG. 9 corresponds to processing performed by the third command transmission unit. Audio data communicated in S120 shown in FIG. 9 correspond to second data. If the result of S108 shown in FIG. 9 is NO, processing for transmitting an INVITE command to the SIP server 10 in S62 shown in FIG. 8 corresponds to processing performed by the fourth command transmission unit. In this case, audio data communicated in S80 shown in FIG. 8 correspond to second data.

If the second terminal device 100 transmits an INVITE command to the SIP server 10, processing for transmitting a public key obtaining request in S72 shown in FIG. 8 corresponds to processing performed by the public key transmission unit. If the second terminal device 100 receives an INVITE command from the SIP server 10, processing for transmitting a public key in S142 shown in FIG. 10 corresponds to processing performed by the public key transmission unit. Further, processing for receiving an INVITE command including a transmission-side challenge code (i.e., processing performed if the result of S130 shown in FIG. 10 is YES), generating a receiving-side response code in S160 shown in FIG. 11, and transmitting a 200 OK command including the receiving-side response code in S164 and S168 shown in FIG. 11 corresponds to processing performed by the challenge data communication unit. Processing for receiving an ACK command in S166 and S170 shown in FIG. 11 corresponds to processing performed by the command receiving unit. Audio data communicated in S178 shown in FIG. 11 corresponds to third data in this case.

Although the specific embodiment of the present invention has been described in detail thus far, the embodiment is a mere illustration and does not limit the scope of claims. The technique described in the claims encompasses various modifications and alterations of the specific embodiment mentioned above. Exemplified modifications of the embodiment are provided below.

(1) The technique described in connection with the embodiment can also be applied to a communication system other than the phone communication. For example, the technique may be applied to a FAX data communication system and a communication system of video data and audio data.

(2) The SIP server 10 and the STUN server 40 may be assembled into a single unit. Further, other two or more devices (e.g., the first NAT router 52 and the STUN server 40) described in connection with the embodiment may also be assembled into a single unit.

(3) In the embodiment, the first terminal device 60 and the second terminal device 100 belong to the different local networks 50 and 150, respectively. However, the first terminal device 60 and the second terminal device 100 may belong to a single (same) local network. In this case, the first terminal device 60 and the second terminal device 100 may store local addresses as the communication information 82 and 122. In this case, the first terminal device 60 and the second terminal device 100 may resume a phone communication by use of the local addresses.

(4) In the above embodiment, the terminal devices 60 and 100 send the STUN server 40 inquiries about their own global addresses. However, the terminal devices 60 and 100 may send the NAT routers 52 and 152 inquiries about their own global addresses by utilization of an UPnP.

(5) As shown, for example, in FIG. 5, in the embodiment, after the second terminal device 100 has transmitted the ACK command 208, the public keys K1 and K2 are communicated between the first terminal device 60 and the second terminal device 100. However, the second terminal device 100 may allow, for example, the INVITE command 200 to include the public key K2 or the ACK command 208 to include the public key K2. In the former case, the first terminal device 60 may allow the 200 OK command 204 to include the public key K1. Further, in the latter case, the first terminal device 60 may transmit the public key K1 to the second terminal device 100 on receipt of the ACK command 208 (210).

Technical elements described in connection with the specification and the drawings shall exhibit technical usefulness solely or in combination and are not limited to the combinations described in connection with the claims as filed. The techniques exemplified in connection with the specification or the drawings shall concurrently attain a plurality of objects, and attainment of one of the objects results in exhibition of the technical usefulness.

What is claimed is:

1. A terminal device comprising:
a processor; and
memory storing instructions that, when executed by the processor, cause the terminal device to:
 transmit a first invite command to a connection management server, the first invite command including a first SIPURI assigned to another terminal device, a second SIPURI assigned to the terminal device and a second global address assigned to the terminal device;
 receive a first global address assigned to the other terminal device from the connection management server in response to the first invite command;
 establish a first RTP communication session with the other terminal device, the terminal device being configured to transmit to and receive from the other terminal device any data by using the first global address and the second global address without communication via the connection management server during the first RTP communication session;
 transmit, to the other terminal device during the first RTP communication session, a first request for first authentication information of the other terminal device, the first request including second authentication information of the terminal device;
 receive the first authentication information from the other terminal device during the first RTP communication session;
 store the first global address and the first authentication information in a storage area for a predetermined amount of time, the first global address and the first authentication information being associated with the first SIPURI, wherein the first global address and the first authentication information are deleted after the predetermined amount of time has elapsed;
 terminate the first RTP communication session with the other terminal device;
 transmit, after terminating the first RTP communication session with the other terminal device, a second invite command to the first global address stored in the storage area without communication with the connection management server, the second invite command including the first SIPURI, the second SIPURI, the second global address and a challenge code;
 receive a response code from the other terminal device in response to the second invite command;
 process the response code by using the first authentication information stored in the storage area;
 compare the processed response code with the challenge code;
 determine whether the processed response code is identical to the challenge code;
 transmit, when the processed response code is identical to the challenge code, an acknowledgment to the other terminal device at the first global address without communication with the connection management server; and
 establish a second RTP communication session with the other terminal device, the terminal device being configured to transmit to and receive from the other terminal device any data by using the first global address and the second global address without communication via the connection management server during the second RTP communication session.

2. The terminal device according to claim 1, wherein the instructions, when executed by the processor, further cause the terminal device to:
 transmit, when the processed response code is not identical to the challenge code, data to the other terminal device at a third global address currently assigned to the first terminal device, instead of the first global address, via the connection management server.

3. The terminal device according to claim 1,
wherein the response code is generated by the other terminal device by encrypting the challenge code using a secret key of the other terminal device,
wherein the first authentication information includes a public key of the other terminal device, and
wherein processing the received response code includes decrypting the received response code using the public key of the other terminal device.

4. The terminal device according to claim 3, wherein the instructions, when executed by the processor, further cause the terminal device to determine whether the response code is received.

5. The terminal device according to claim 1,
wherein the terminal device is caused to transmit, to the other terminal device during the first RTP communication session, the first request for first authentication information of the other terminal device immediately after establishing the first RTP communication session.

6. The terminal device according to claim 1, wherein the instructions, when executed by the processor, further cause the terminal device to:
 transmit a public key of the terminal device to the first global address as a destination;
 receive another challenge code transmitted by the other terminal device to terminal device;
 encrypt the received other challenge code using a secret key of the terminal device so as to generate another response code; and
 transmit the other response code to the terminal device; and
 if decrypted data generated by the other terminal device by decrypting the other response code using the public key of the terminal device matches the other challenge code, receive data transmitted by the other terminal device to the terminal device.

7. A system comprising:
a connection management server;
a first terminal device to which a first SIPURI and a first global address are assigned; and
a second terminal device to which a second SIPURI and a second global address are assigned,
wherein the second terminal device comprises:
 a processor;
 a storage unit; and
 memory storing computer readable instructions that, when executed by the processor, cause the second terminal device to:
  transmit a first invite command to the connection management server, the first invite command including the first SIPURI, the second SIPURI and the second global address;
  receive the first global address from the connection management server in response to the first invite command;
  establish a first RTP communication session with the first terminal device, the second terminal device being configured to transmit to and receive from the first terminal device any data by using the first global address and the second global address without communication via the connection management server during the first RTP communication session;
transmit, to the first terminal device during the first RTP communication session, a first request for first authentication information of the first terminal device, the first request including second authentication information of the second terminal device;
receive the first authentication information from the first terminal device during the first RTP communication session;
store the first global address and the first authentication information in the storage unit for a predetermined amount of time, the first global address and the first authentication information being associated with the first SIPURI, wherein the first global address and the first authentication information are deleted after the predetermined amount of time has elapsed;
terminate the first RTP communication session with the first terminal device;
transmit, after terminating the first RTP communication session with the first terminal device, a second invite command to the first global address stored in the storage device without communication with the connection management server, the second invite command including the first SIPURI, the second SIPURI, the second global address and a challenge code;
receive a response code from the first terminal device in response to the second invite command;
process the response code by using the first authentication information stored in the storage unit;
compare the processed response code with the challenge code;
determine whether the processed response code is identical to the challenge code;
transmit, when the processed response code is identical to the challenge code, an acknowledgment to the first terminal device at the first global address without communication with the connection management server; and
establish a second RTP communication session with the first terminal device, the second terminal device being configured to transmit to and receive from the first terminal device any data by using the first global address and the second global address without communication via the connection management server during the second RTP communication session,
wherein the connection management server comprises:
a processor;
a storage unit configured to store the first global address in association with the first SIPURI and the second global address in association with the second SIPURI address; and
memory storing instructions that, when executed by the processor, cause the connection management server to:
receive the first invite command from the second terminal device;
determine the first global address by analyzing the first SIPURI included in the first invite command;
transmit the first invite command to the determined first global address;
receive the first global address from the first terminal device; and
transmit the received first global address to the second terminal device and an acknowledgment to the first terminal device, and
wherein the first terminal device comprises:
a processor;
a storage unit; and
memory storing instructions that, when executed by the processor, cause the connection management server to:
receive the first invite command from the connection management server;
transmit the first global address to the connection management server in response to receipt of the first invite command;
receive the acknowledgment from the connection management server;
establish the first RTP communication session with the second terminal device, the first terminal device being configured to transmit to and receive from the second terminal device any data by using the first global address and the second global address without communication via the connection management server during the first RTP communication session;
receive the first request for the first authentication information from the second terminal device;
store, in the storage unit, the second authentication information included in the first request, the second authentication information being associated with the second SIPURI and the second global address in the storage unit;
transmit the first authentication information to the second terminal device during the first RTP communication session;
terminate the first RIP communication session with the second terminal device;
receive the second invite command from the second terminal device;
generate the response code by processing the challenge code;
transmit the response code to the second terminal device without communication with the connection management server;
receive the acknowledgment from the second terminal device; and
establish the second RTP communication session with the second terminal device, the first terminal device being configured to transmit to and receive from the second terminal device any data by using the first global address and the second global address without communication via the connection management server.

8. A non-transitory machine readable medium having instructions that, when executed, cause a terminal device to:
transmit a first invite command to a connection management server, the first invite command including a first SIPURI assigned to another terminal device, a second SIPURI assigned to the terminal device and a global address assigned to the terminal device;
receive a global address assigned to the other terminal device from the connection management server in response to the first invite command;
establish a first RTP communication session with the other terminal device, the terminal device being configured to transmit to and receive from the other terminal device any data by using the first global address and the second global address without communication via the connection management server during the first RTP communication session;

transmit, to the other terminal device during the first RTP communication session, a first request for first authentication information of the other terminal device, the first request including second authentication information of the terminal device;

receive the first authentication information from the other terminal device during the first RTP communication session;

store the first global address and the first authentication information in a storage area for a predetermined amount of time, the first global address and the first authentication information being associated with the first SIPURI, wherein the first global address and the first authentication information are deleted after the predetermined amount of time has elapsed;

terminate the first RTP communication session with the other terminal device;

transmit, after terminating the first RTP communication session with the other terminal device, a second invite command to the first global address stored in the storage area without communication with the connection management server, the second invite command including the first SIPURI, the second SIPURI, the second global address and a challenge code;

receive a response code from the other terminal device in response to the second invite command;

process the response code by using the first authentication information stored in the storage area;

compare the processed response code with the challenge code;

determine whether the processed response code is identical to the challenge code;

transmit, when the processed response code is identical to the challenge code, an acknowledgment to the other terminal device at the first global address without communication with the connection management server; and establish a second RTP communication session with the other terminal device, the terminal device being configured to transmit to and receive from the other terminal device any data by using the first global address and the second global address without communication via the connection management server during the second RTP communication session.

\* \* \* \* \*

UNITED STATES PATENT AND TRADEMARK OFFICE
CERTIFICATE OF CORRECTION

| | |
|---|---|
| PATENT NO. | : 8,713,313 B2 |
| APPLICATION NO. | : 12/715505 |
| DATED | : April 29, 2014 |
| INVENTOR(S) | : Yasuhiro Kudo |

It is certified that error appears in the above-identified patent and that said Letters Patent is hereby corrected as shown below:

In the Claims

Column 20, Claim 6, Line 34:
After "to" please insert --the--

Signed and Sealed this
First Day of December, 2015

Michelle K. Lee
*Director of the United States Patent and Trademark Office*